United States Patent
Guntur et al.

(10) Patent No.: US 8,836,379 B2
(45) Date of Patent: Sep. 16, 2014

(54) CLOCK SELECTION CIRCUIT AND METHOD

(71) Applicant: NXP B.V., Eindhoven (NL)

(72) Inventors: Surendra Guntur, Eindhoven (NL); Ghiath Al-kadi, Eindhoven (NL); Rinze Ida Mechtildis Peter Meijer, Eindhoven (NL); Jan Hoogerbrugge, Eindhoven (NL); Hamed Fatemi, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/175,822

(22) Filed: Feb. 7, 2014

(65) Prior Publication Data

US 2014/0223220 A1    Aug. 7, 2014

(30) Foreign Application Priority Data

Feb. 1, 2013 (EP) .................................. 13153740

(51) Int. Cl.
*H03K 17/00* (2006.01)
*G06F 1/08* (2006.01)

(52) U.S. Cl.
CPC ........................................ *G06F 1/08* (2013.01)
USPC ............................... 327/99; 327/98; 327/407

(58) Field of Classification Search
USPC ............................................. 327/98, 99, 407
See application file for complete search history.

(56) References Cited

U.S. PATENT DOCUMENTS

| | | | | |
|---|---|---|---|---|
| 3,653,001 A * | 3/1972 | Ninke | ............................ | 345/690 |
| 5,289,050 A | 2/1994 | Ogasawara | | |
| 5,787,488 A * | 7/1998 | Garde | ............................ | 711/169 |
| 6,288,589 B1 | 9/2001 | Potter et al. | | |
| 6,300,809 B1 * | 10/2001 | Gregor et al. | .................. | 327/200 |
| 6,653,867 B1 | 11/2003 | Shihadeh | | |
| 6,748,549 B1 * | 6/2004 | Chao et al. | ..................... | 713/401 |
| 7,606,991 B2 | 10/2009 | Gupte et al. | | |
| 7,913,103 B2 | 3/2011 | Gold et al. | | |
| 8,509,011 B2 * | 8/2013 | Bringivijayaraghavan | ... | 365/194 |
| 8,630,336 B2 * | 1/2014 | Abbasfar | ....................... | 375/229 |
| 8,644,096 B2 * | 2/2014 | Bringivijayaraghavan | ... | 365/194 |
| 2002/0075042 A1 | 6/2002 | Ohkawa | | |
| 2007/0033427 A1 * | 2/2007 | Correale et al. | .............. | 713/500 |
| 2009/0063888 A1 * | 3/2009 | Gold et al. | ..................... | 713/501 |
| 2011/0249774 A1 * | 10/2011 | Thakkar et al. | ............... | 375/316 |
| 2012/0020695 A1 * | 1/2012 | Claassen | ......................... | 399/88 |
| 2013/0093462 A1 * | 4/2013 | Teig et al. | ........................ | 326/38 |
| 2013/0300482 A1 * | 11/2013 | Abbasfar | ...................... | 327/244 |

OTHER PUBLICATIONS

Mahmud, R. Techniques to Make Clock Switching Glitch Free, 7 pgs., retrieved from the Internet on Feb. 6, 2014 at: http://www.design-reuse.com/articles/5827/techniques-to-makeclock-switching-glitch-free.html.

Teng, X. "High Speed Circuit Design—Time Borrowing and Time Stealing", 5 pgs.

Extended European Search Report for EP Patent Appln. No. 13153740.9 (Jul. 16, 2013).

* cited by examiner

*Primary Examiner* — Adam Houston

(57) ABSTRACT

The invention provides a clock select circuit and method which uses feedback arrangements between latches in different branches, with each branch for coupling an associated clock signal to the circuit output. An override circuit is provided in one of the feedback arrangements for preventing a latching delay in that feedback arrangement. This enables rapid switching between clocks in both directions.

15 Claims, 15 Drawing Sheets

| Stage No. | Col1 | Col2 | Col3 | Col4 | Col5 | Col6 |
|---|---|---|---|---|---|---|
| S1 | 0 (op1) | P (op2) | 2P (op3) | 3P (op4) | 4P+Φ (op5) | 5P (5P+Φ) (op6) |
| S2 |  | P (op1) | 2P (op2) | 3P (op3) | 4P+Φ (op4) | 5P (5P+Φ) (op5) |
| S3 |  |  | 2P (op1) | 3P (op2) | 4P+Φ (op3) | 5P (5P+Φ) (op4) |
| S4 |  |  |  | 3P (op1) | 4P+Φ (op2) | 5P (5P+Φ) (op3) |

FIG. 13

| Stage No. | Col1 | Col2 | Col3 | Col4 | Col5 | Col6 |
|---|---|---|---|---|---|---|
| S1 | 0 (op1) | P (op2) | 2P (op3) | 3P (op4) | 4P-Φ (op5) | 5P (op6) |
| S2 |  | P (op1) | 2P (op2) | 3P (op3) | 4P-Φ (op4) | 5P (op5) |
| S3 |  |  | 2P (op1) | 3P (op2) | 4P-Φ (op3) | 5P (op4) |
| S4 |  |  |  | 3P (op1) | 4P-Φ (op2) | 5P (op3) |

CLOCK SELECTION CIRCUIT AND METHOD

CROSS-REFERENCE TO RELATED APPLICATIONS

This application claims the priority under 35 U.S.C. §119 of European patent application no. 13153740.9, filed on Feb. 1, 2013, the contents of which are incorporated by reference herein.

This invention relates to clock selection circuits and methods, and in particular for controlling the clock signals used within integrated circuits.

It is well known that Integrated Circuit (IC) semiconductor manufacturing in deep submicron (40 nm and below) technologies is highly susceptible to spatial and temporal process variations. These process and parameter variations (With-In Die (WID), Die to Die (D2D) and lot-to-lot) typically manifest as timing variations at circuit/logic levels. A traditional worst case design methodology attempts to meet the specified clock frequency requirements by considering worst case operating conditions and synthesizing designs that have sufficient timing guardbands resulting in an area overhead.

A Better Than Worst Case (BTWC) design approach on the other hand offers a better trade-off between area and performance with the following notable characteristics:

(i) The architecture is designed for typical operating conditions with reduced timing guardbands and not worst case conditions.

(ii) Timing errors can occur due to reduced timing margins in critical paths when the dynamic operating conditions (e.g. temperature/voltage) change or aging make circuits slower than the specified operating frequency.

The timing degradation issue stated above must be handled in a proper manner if the architecture is to operate correctly and is to be variation resilient. Time borrowing or cycle borrowing is a well known technique that allows a logic stage in a pipeline to complete its execution even in the presence of limited timing degradation by borrowing time from a previous cycle.

Time borrowing by definition permits logic to automatically use slack time from a previous cycle. This passing of slack time from one cycle or phase to the next is automatic and without any additional circuitry or clock adjustments. Thus, time borrowing is a term that is exclusively used for latch based designs since the level sensitivity of latches automatically offers the possibility of time borrowing.

Nowadays nearly all complex digital chip designs work with edge triggered flops since they retime their output making timing analysis easy for static timing analysis tools. "Time stealing" or "cycle stealing" is the term normally associated with edge triggered flip-flops. By this approach, evaluation time is gained by taking time from the next cycle, by explicitly adjusting the clock arrival time or phase. This happens when a pipeline stage needs additional time for completing its operation but cannot use left over time from a previous cycle or phase as in the case of time borrowing.

In other words, time stealing does not automatically use slack from a previous cycle. It has to be forced to steal evaluation time from a subsequent cycle or phase and leave less time to that (subsequent) cycle or phase which is achieved by adjusting clock arrival time.

There are various approaches to adjusting clock arrival time at different logic stages of a pipeline:

1. To generate multiple clock phases and provide a delayed clock to each successive pipeline stage to exploit time borrowing. In this method, the clock distribution network provides each successive pipeline register (or processing element) with a clock signal such that the clock arrives with an increasing amount of delay at each stage. An example is disclosed in U.S. Pat. No. 7,606,991.

2. To use a single clock but rely on tunable delay buffers in the clock network that enable the insertion of intentional skew to the signal that reaches individual pipeline registers at different times.

3. To use multiple clock phases and switch between different phases so that extra time is made available to successive stages. Since clock distribution of multiple clocks or their phases can become complicated, a single global clock is distributed and different phases are generated locally as needed.

This invention is based on the clock switch architecture identified as 3 above. In particular, the invention relates to an architecture in which there are fixed clock phases and clock control circuitry is used that intelligently switches between the phases (and hence exploits time stealing) when possible/needed so as to make the design work at the average clock period instead of the worst clock period.

Switching between clock phases provides additional time to certain pipeline operations and less time to certain less demanding operations resulting in an "elastic pipelined execution". This mechanism of execution also makes the design resilient to timing variations.

According to the invention, there is provided a system and method as claimed in claim claims.

In one aspect, the invention provides a clock select circuit for providing a selected clock signal to its output, comprising:

a first branch, which includes a first latch clocked by a first clock signal, the first branch having a logic gate at the output for passing the first clock signal to the circuit output in dependence on the first latch output;

a second branch, which includes a second latch clocked by a second clock signal, the second branch having a logic gate at the output for passing the second clock signal to the circuit output in dependence on the second latch output;

a first feedback arrangement from the output of the first latch to the second branch before the second latch;

a second feedback arrangement from the output of the second latch to the first branch before the first latch; and an override circuit provided in the first or second feedback arrangements for preventing a latching delay in that feedback arrangement.

This circuit selects between two clock signals, in particular with one comprising a phase delayed version of the other.

Sequential phases of the output clock signal can for example be used to control sequential operations in a particular pipeline stage. One pipeline stage can thus be provided with additional time than the normal clock period for completing its operation by switching from the operating reference clock to a phase delayed clock. Under favourable circumstances (e.g. when there is sufficient slack or on a pipeline stall), a switchback can be made from the phase delayed clock to the reference clock. Thus, the circuit can be used to extend one pipeline operation and recover time when feasible thereby achieving a form of clock period averaging. Alternatively, by remaining with the phase delayed clock, a switch can be made to yet another phase delayed clock if one exists thereby achieving continuous phase hopping between clocks.

The circuit can alternatively reduce the time required for a pipeline operation by switching from the reference clock to a phase advanced clock and instead allocate more time to the next cycle by making a switchback from the phase advanced clock to the reference clock. This method compresses the current cycle of execution and provides the ability to lend time for a successive or later cycle by allowing time stealing.

The override circuit means that the circuit can provide rapid switching both from one clock to a phase delayed version of the clock as well as from one clock back to a phase advanced version of the clock. This means the circuit can switch from one clock to the other and back without requiring additional cycles. Thus one clock cycle can lend time to the next, or else one clock cycle can steal time from the next. The circuit of the invention can allow stalling of a pipeline stage by less than a cycle by opportunistically switching to a phase lagged clock and compressing the stall cycle. This compression reduces the performance impact of a stall.

A clock select signal is preferably provided to one branch and an inverted clock select signal is provided to the other branch. These clock select signals dictate which branch is to provide the clock signal to the circuit output.

Each branch can comprise an AND gate which receives the clock select signal or inverted clock select signal and a feedback signal, wherein the output of the AND gate is provided to the input of the latch. In this way, the feedback signal triggers switching of the latches so that one branch takes over from the other. Each branch can also comprise an AND gate at the end of the branch, which receives the latch output and the clock signal associated with the latch. This functions as a pass gate which either passes or blocks the clock signal.

The override circuit can comprises a latch having a clock select signal at its input, and a logic gate arrangement for overriding the feedback signal in the associated feedback arrangement. In this way, the feedback signal can be changed before the main latch in a branch has triggered.

The logic gate arrangement can comprise an OR gate for combining the feedback signal of the associated feedback arrangement with the clock select signal latched by the latch of the override circuit.

In one implementation, the circuit is adapted, in response to two sequential changes in clock select signal, to extend the duration of one clock phase by switching from the first clock to the second, phase delayed clock and to switch back from the second clock to the first clock to shorten the duration of a subsequent clock phase.

In another implementation the circuit is adapted, in response to two sequential changes in clock select signal, to shorten the duration of one clock phase by switching from the second, phase delayed clock to the first clock and to switch back from the first clock to the second clock to extend the duration of a subsequent clock phase.

The invention provides a mechanism for dynamic clock switching while minimizing performance impact by providing various possibilities of elastic synchronous pipelined execution in architectures with edge triggered latches (e.g. flip-flops).

The circuit is glitch free and is capable of "period averaging" by switching back from the second clock to the first clock in case sufficient slack exists and the clock switch controller logic determines that the operation in a subsequent stage does not need the entire clock cycle time and can instead be completed early. A pipeline stage can be stalled for a time which is less than a period of the clock signal by a switchback from the phase delayed clock to the reference clock during a stall, thus allowing future time stealing operations and minimizing performance penalty.

The circuit enables a variety of possible pipelined execution patterns and an efficient way of relaxing the strict timing boundary requirements imposed by edge triggered latches and enables a transition to an elastic pipeline that can be more tolerant to timing variations while still retaining the edge triggered design flow that is well supported by commercial electronic design automation and static timing analysis tools.

More complex clock phase processing can be carried out. For example two clock switching circuits (thus with 4 clocks) can be used with a suitable control system to achieve more complex clock phase switching/hopping patterns such as round robin hopping.

The invention also provides a method for selecting a clock signal from at least a first clock signal and a second clock signal, comprising:

clocking a first latch in a first branch with a first clock signal and passing the first clock signal to the circuit output in dependence on the first latch output;

clocking a second latch in a second branch with a second clock signal and passing the second clock signal to the circuit output in dependence on the second latch output;

in a first feedback arrangement, feeding back the output of the first latch to the second branch before the second latch;

in a second feedback arrangement, feeding back the output of the second latch to the first branch before the first latch; and preventing a latching delay in one of the feedback arrangements using an override circuit provided that feedback arrangement.

Examples of the invention will now be described in detail with reference to the accompanying drawings, in which.

Figure 8:
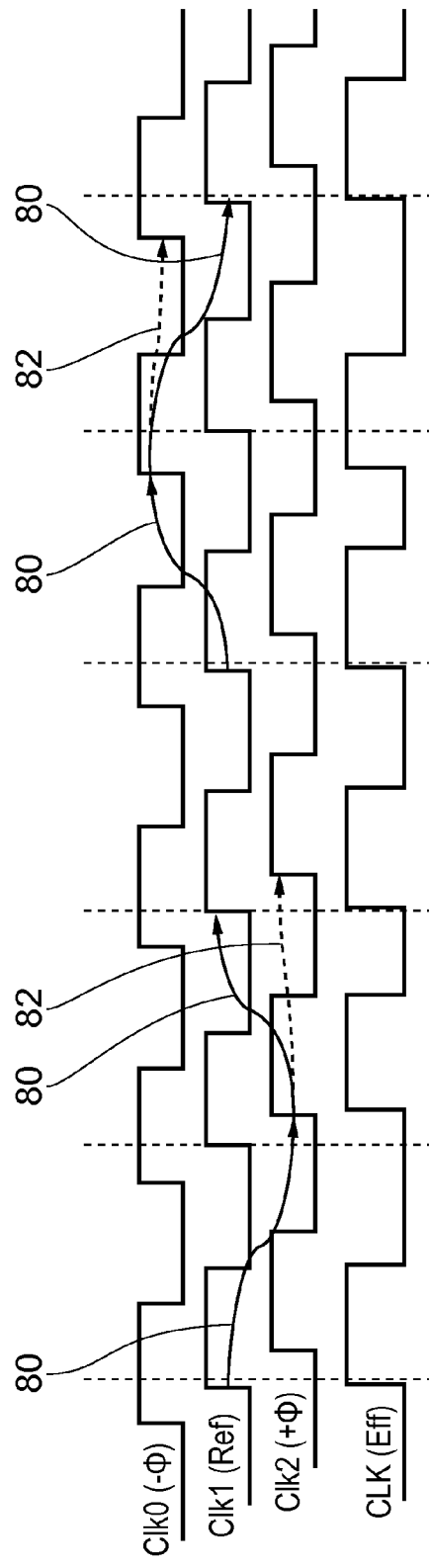
Figure 9:
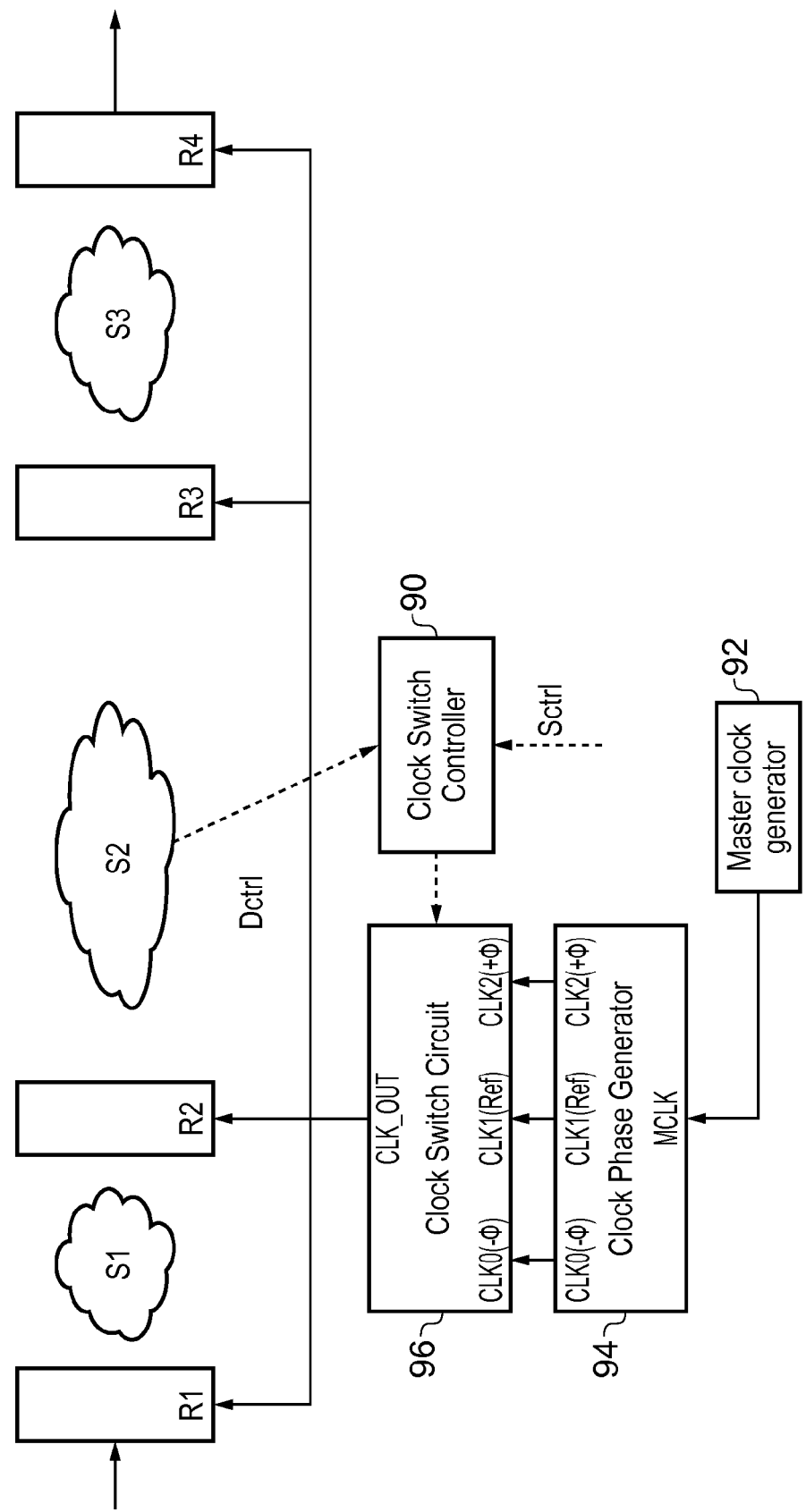
Figure 10:
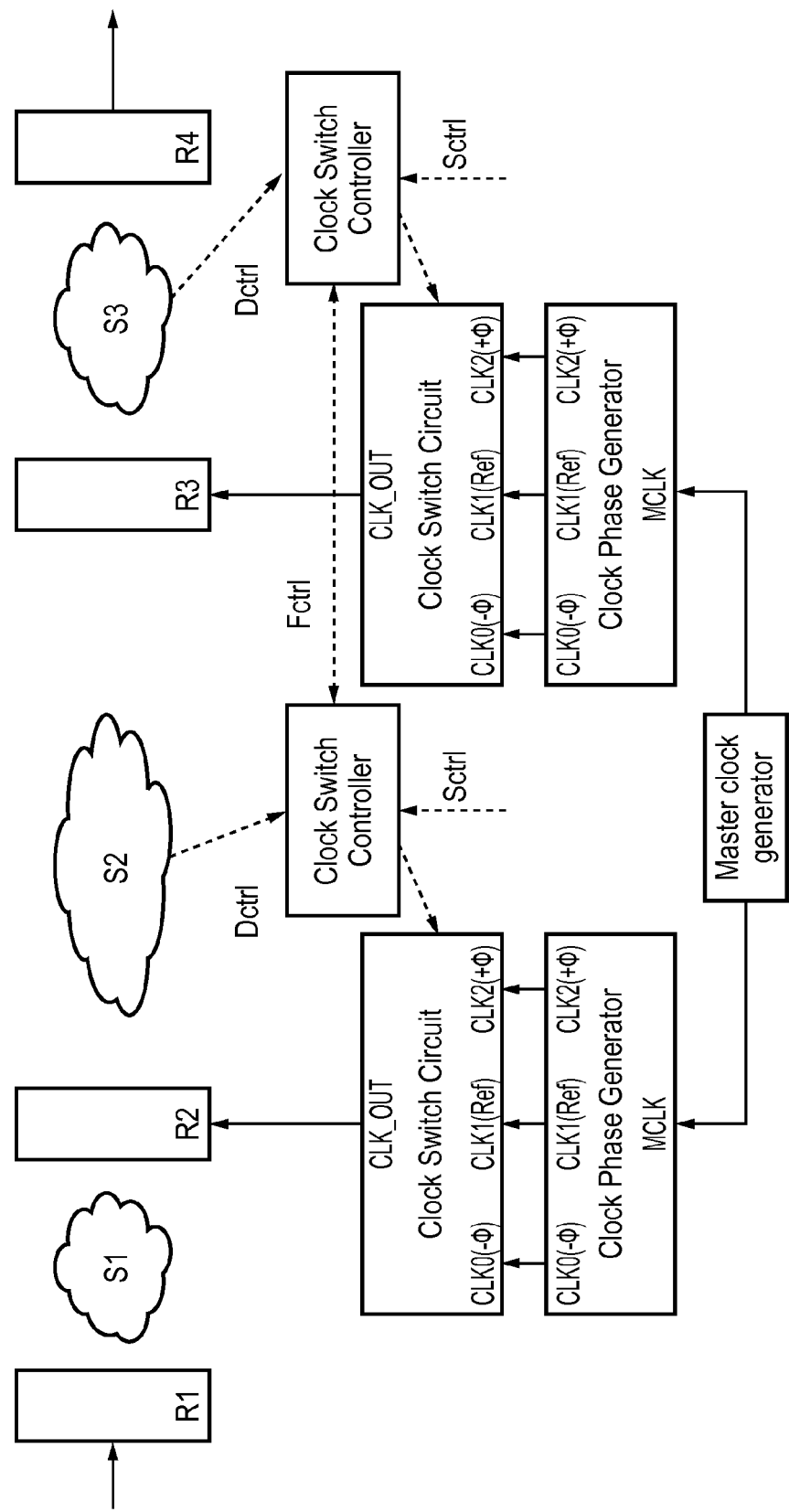
Figure 11:
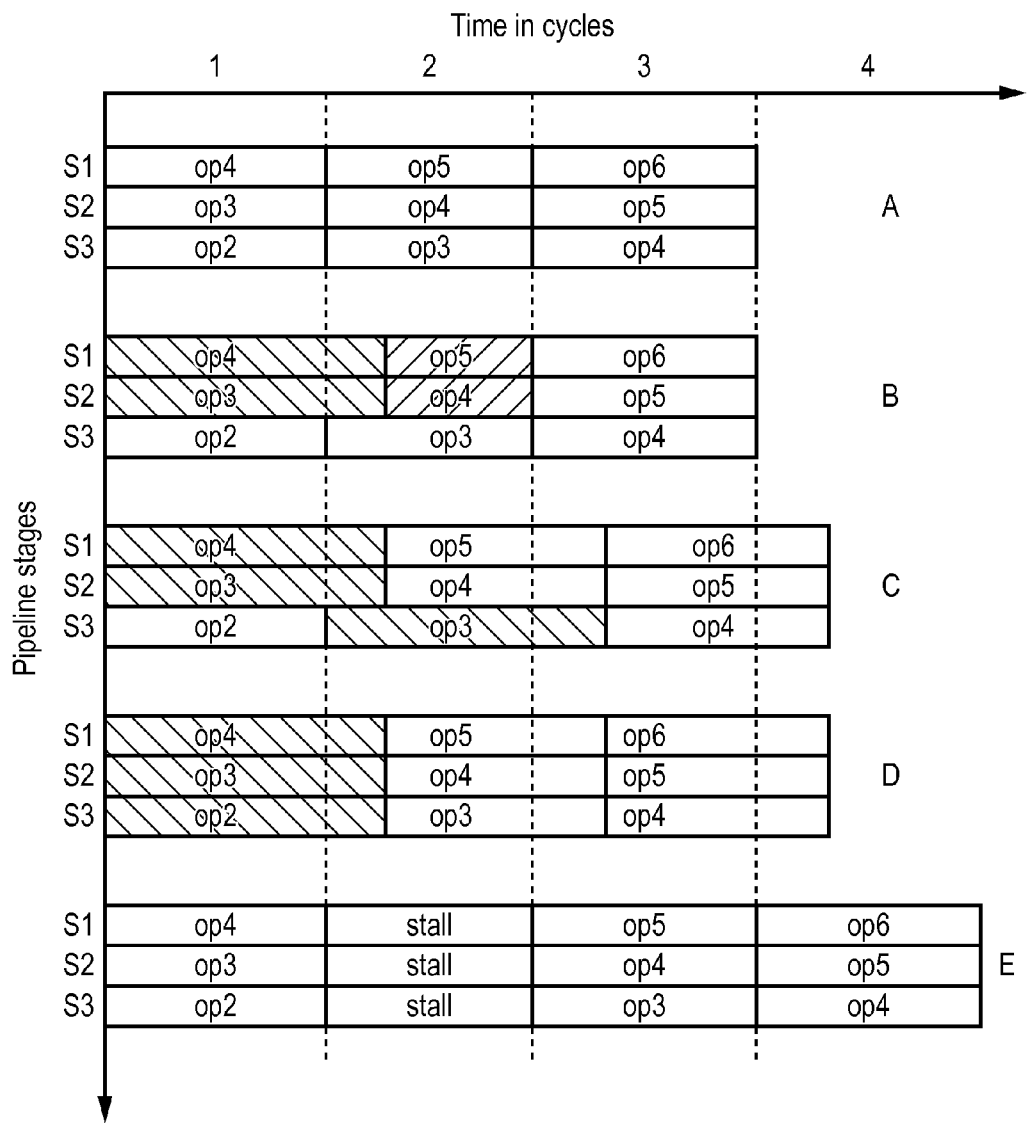
Figure 12:
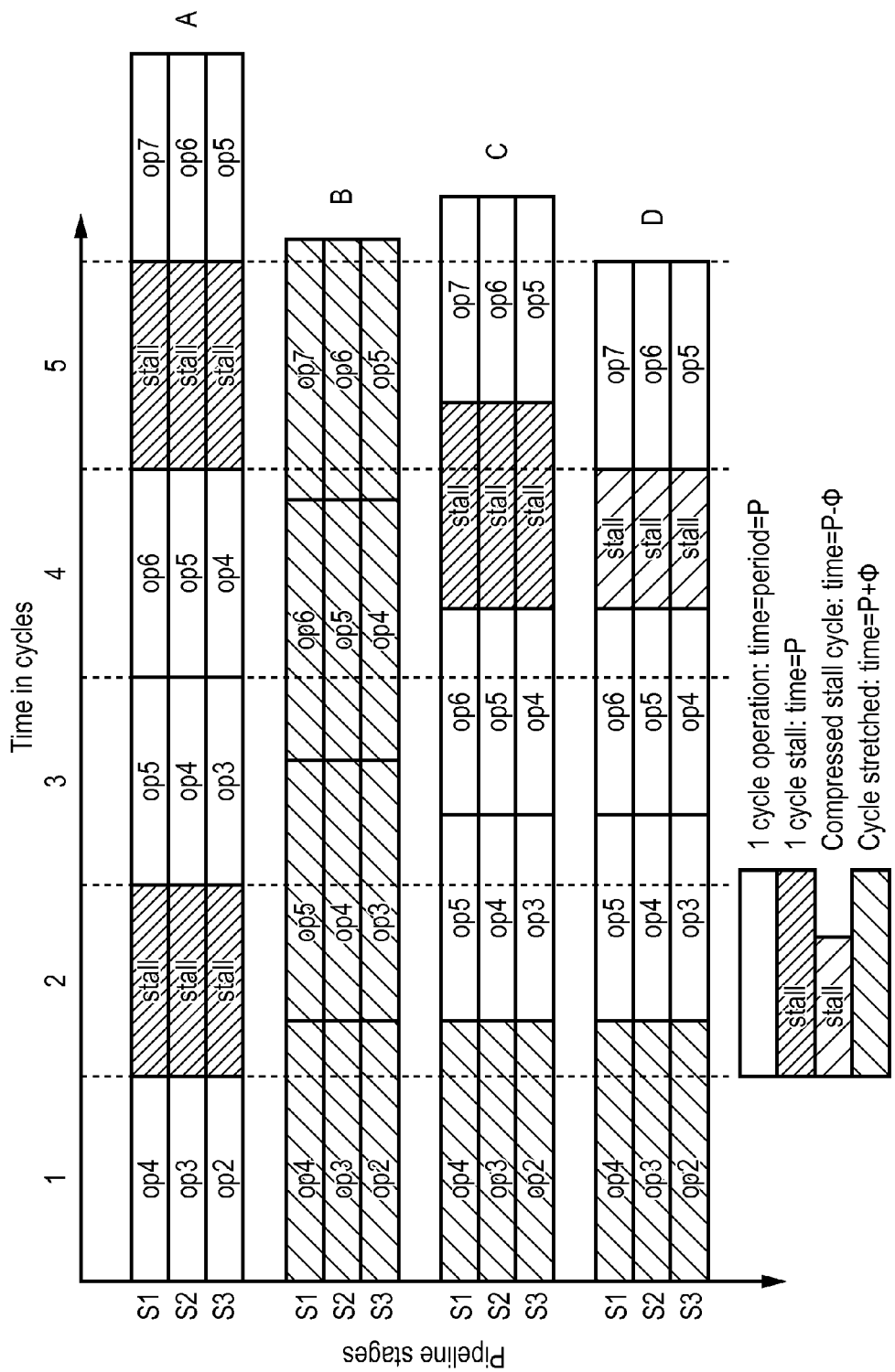

FIG. 8 summarizes various pipeline execution patterns that are possible in a conventional pipeline and in an architecture that is capable of exploiting cycle stealing and lending via clock switching;

FIG. 9 shows a centralized clock switch architecture that enables global clock switching across all pipeline stages;

FIG. 10 shows a distributed clock switch architecture that has per-stage clocks and clock switch control unit;

FIG. 11 shows an example of possible pipeline execution patterns and performance impact due to clock stealing and lending with two clocks;

FIG. 12 shows an approach in which a pipeline is stalled for a time period less than a clock phase;

FIG. 13 shows how cycle stealing with a centralized clock switch can function;

FIG. 14 shows how cycle lending with a centralized clock switch can function.

Figure 15:
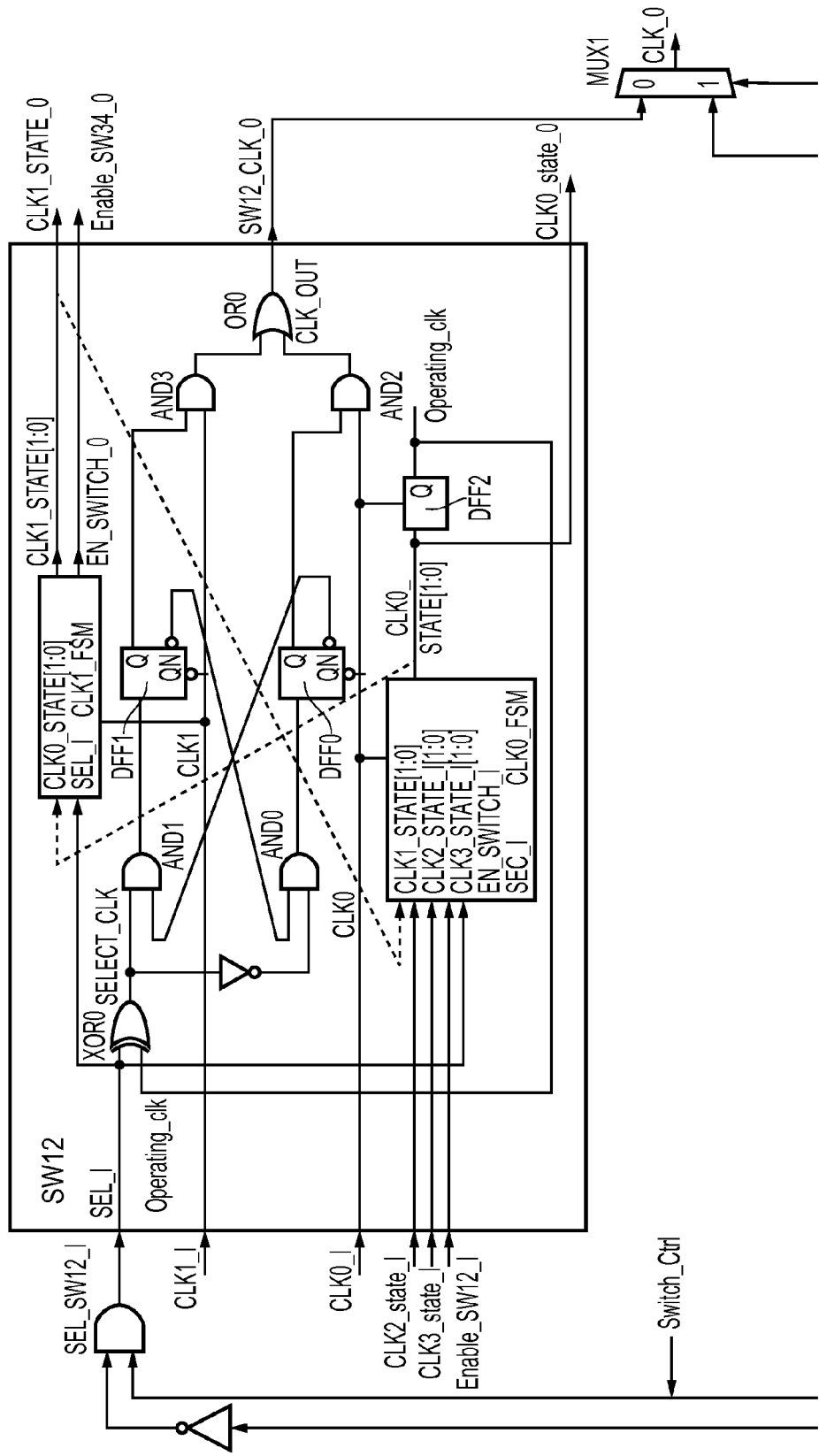
Figure 15:
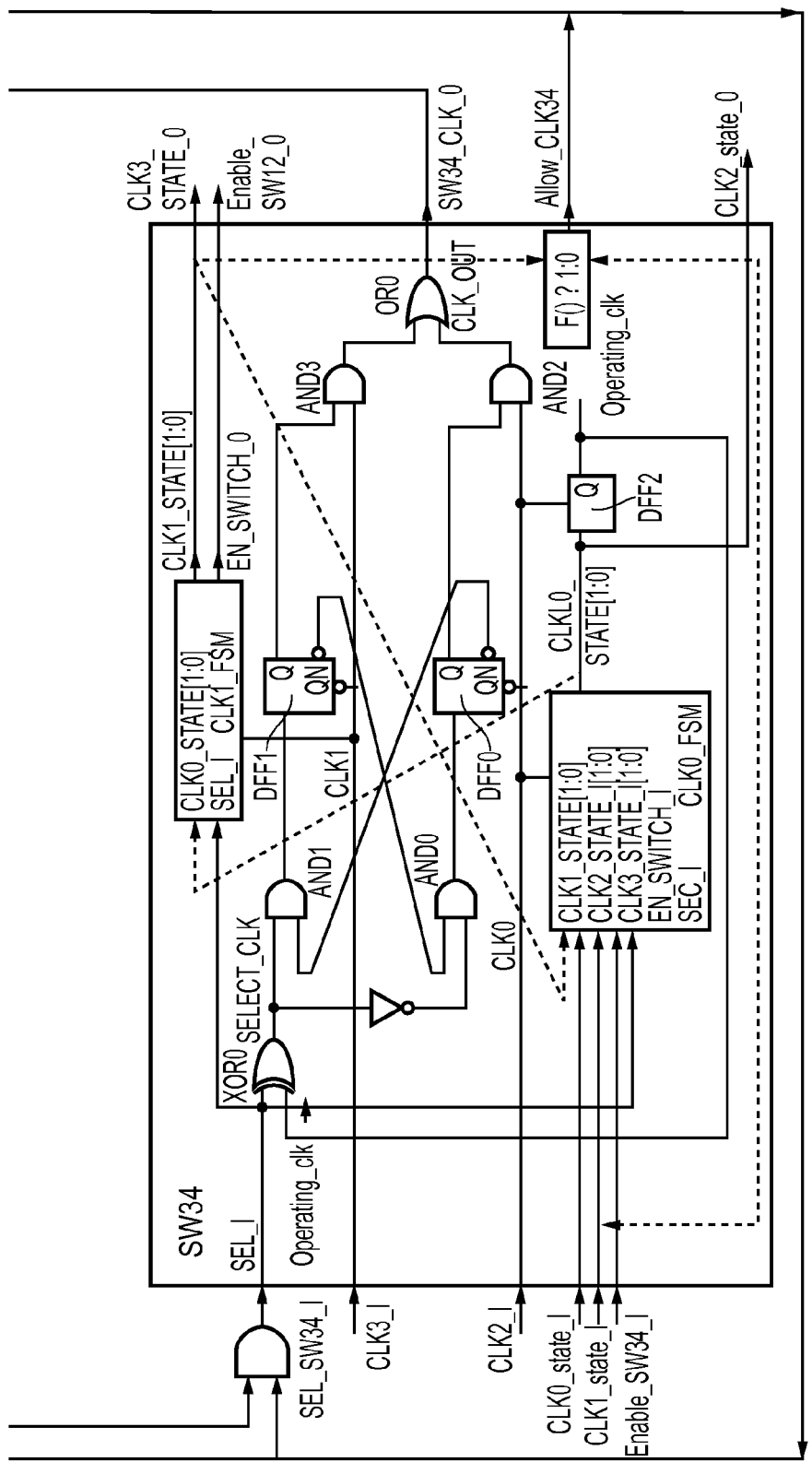
Figure 16:
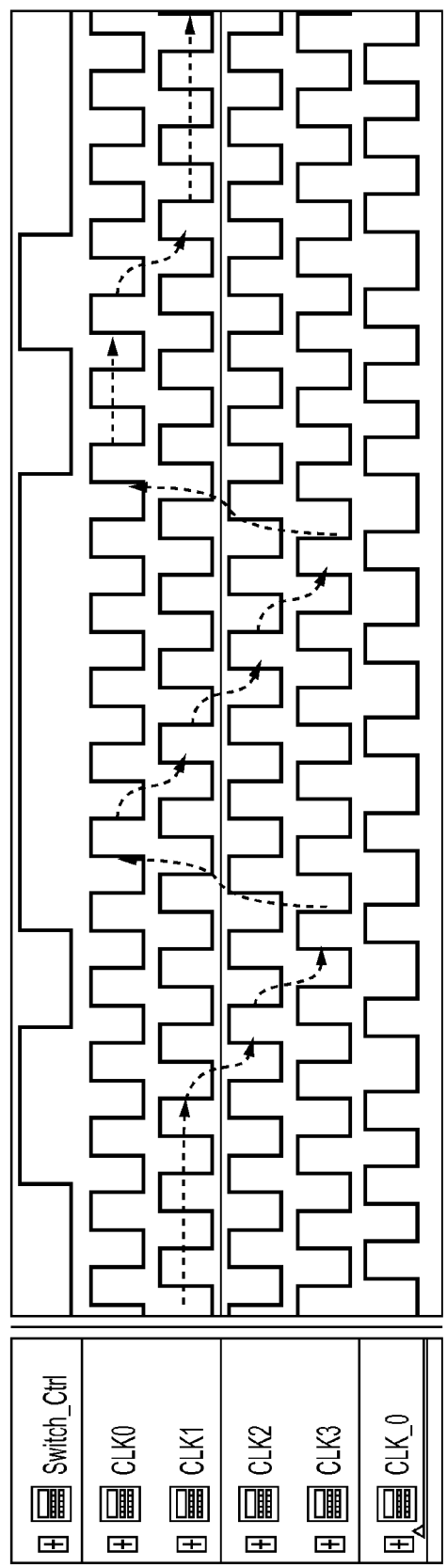
Figure 17:
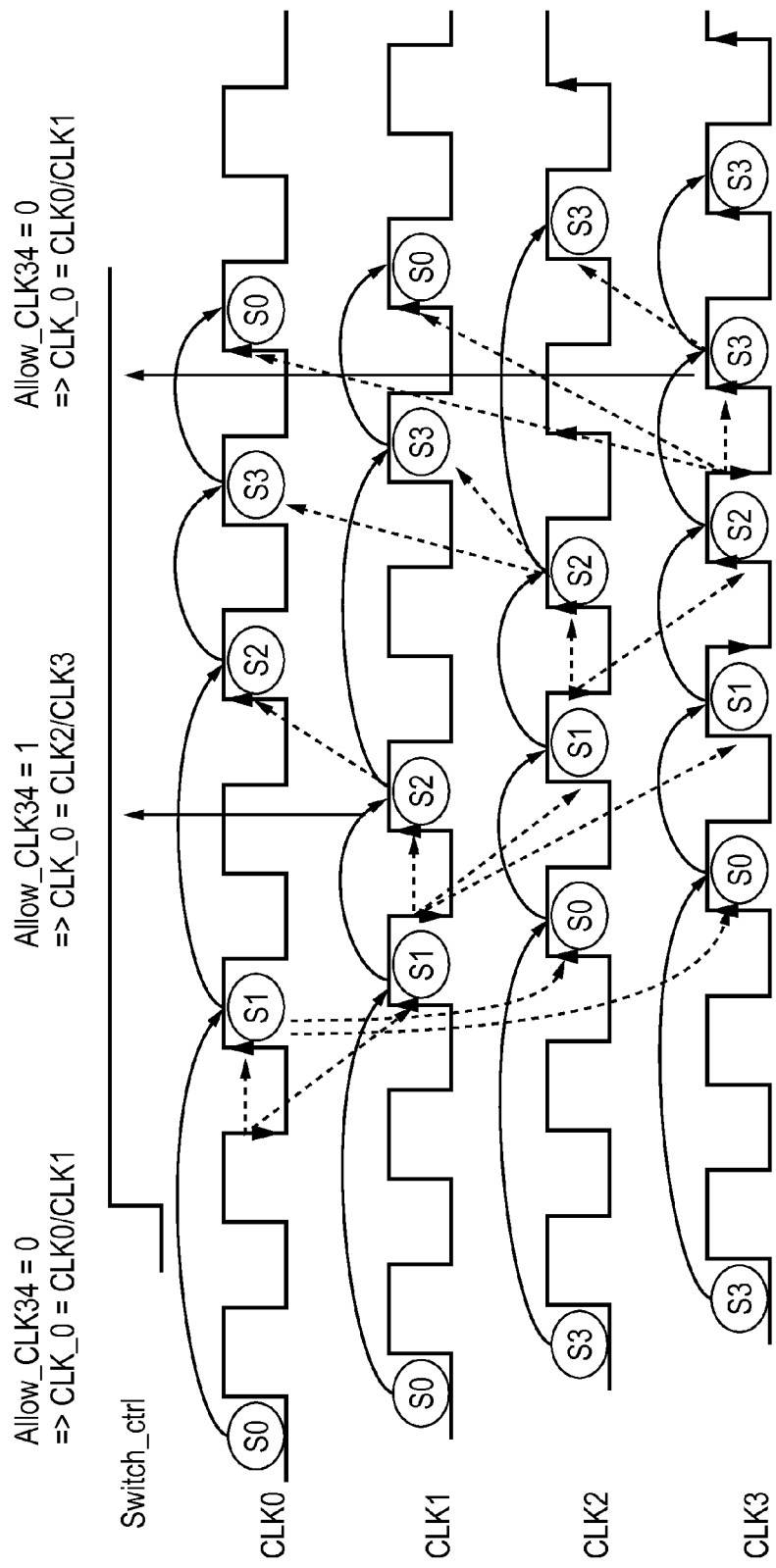

FIG. 15 shows a circuit consisting of two clock switch units connected in feedback each comprising of additional control logic and a suitable Finite State Machine for clock phase hopping between 4 clocks;

FIG. 16 shows an example clock phase switching/hopping pattern that is achieved by the circuit in FIG. 15; and FIG. 17 shows the finite state machine required to achieve the phase hopping behavior of FIG. 16.

The invention provides a clock select circuit and method which uses feedback arrangements between latches in different branches, with each branch for coupling an associated clock signal to the circuit output. An override circuit is provided in one of the feedback arrangements for preventing a latching delay in that feedback arrangement. This enables rapid switching between clocks in both directions (i.e. from clock 1 to clock 2 as well as from clock 2 to clock 1).

The invention can be extended with a suitable FSM and control logic to handle clock switching via continuous phase hopping between 4 clocks.

Before describing the invention, various known approaches will first be outlined.

Figure 1:
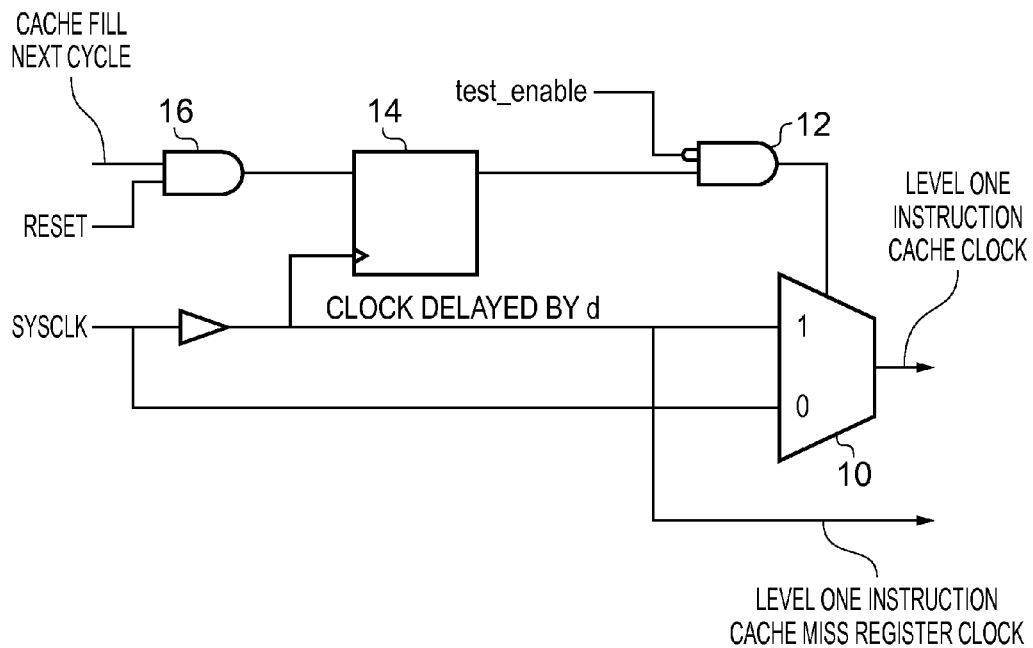
FIG. 1 shows a first known clock selection circuit.
Figure 1:
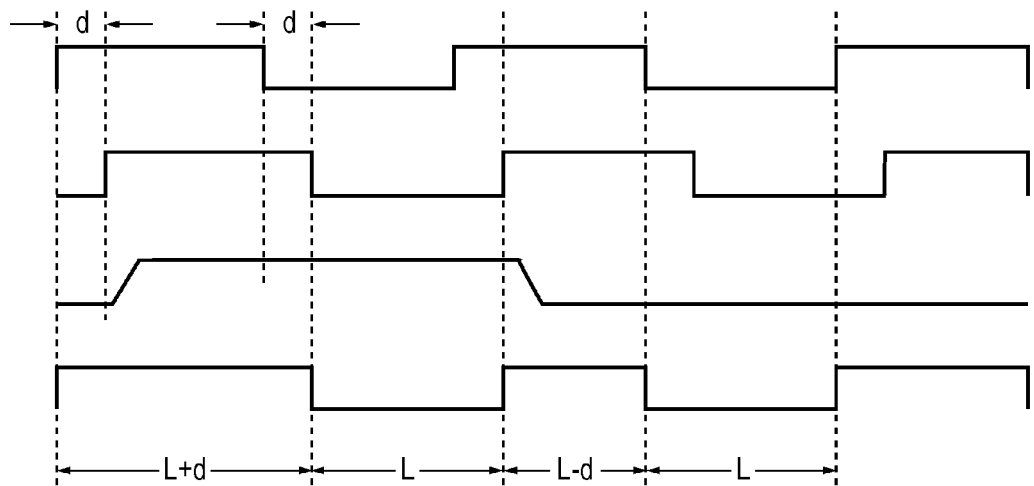

FIG. 1 shows a known circuit for switching from one clock phase to another as disclosed in U.S. Pat. No. 7,606,991 and a timing diagram.

The circuit provides an output at particular triggered times. The system clock SYSCLK is provided to both inputs of a multiplexer 10, with one delayed by an amount d. L is half the period of the system clock. The delayed clock is not used during a test mode, and this is the purpose of the AND gate 12. A flip flop 14 receives the delayed clock and is enabled by AND gate 16, which is controlled by a signal that indicates that a cache fill operation is going to occur at the next instruction cycle. The circuit is used to extend the fetch cycle of a processor pipeline when it is determined that there was a cache miss.

The primary disadvantage of this design is that the decision to switch the clock must be known one cycle earlier or must be known before the time "d" which is the phase difference between the two clocks. Depending on the architecture and pipeline operation, it may or may not be possible for this information to be known that early. For example, in certain cases the need for extra time to complete an operation is known only during the execution of the operation. In such cases, the circuit of FIG. 1 is not capable of extending the cycle time by clock switching.

This invention aims to relax this constraint and enable clock switching as long as the switch signal is available before the negative edge of the clocks concerned (i.e. latest by time L in FIG. 1).

A second disadvantage of the circuit in FIG. 1 is that it performs only cycle stealing (i.e. cycle extension followed by subsequent cycle compression). Cycle lending, which involves cycle time compression followed by cycle time extension, cannot be done.

Figure 2:
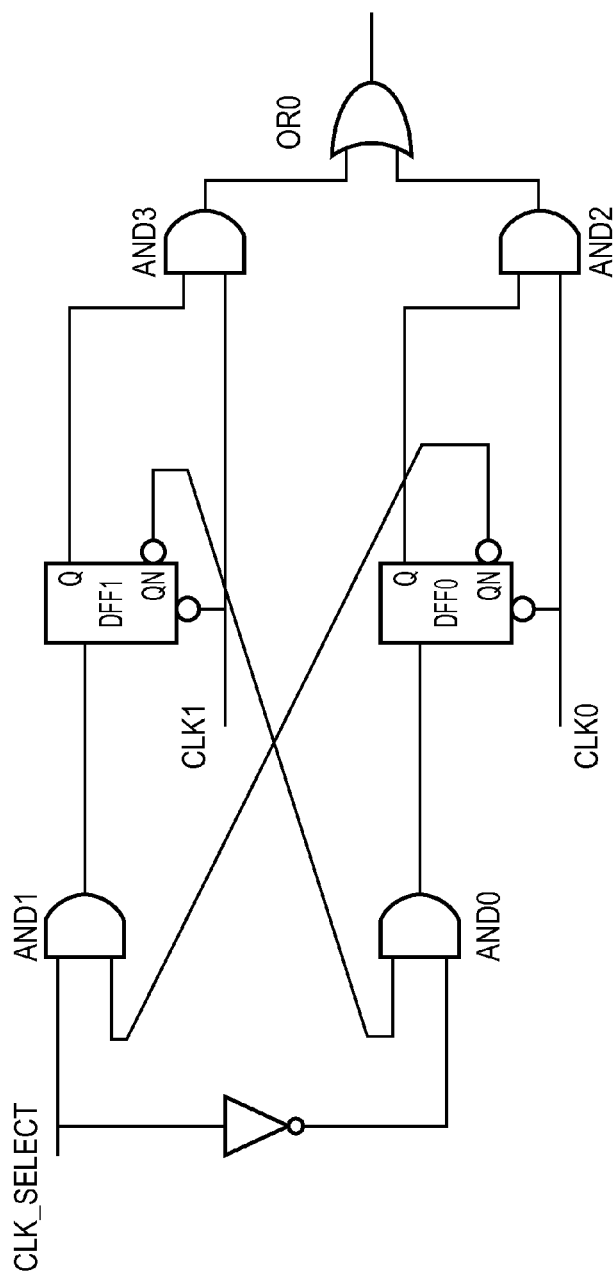
FIG. 2 shows a second known clock selection circuit.

FIG. 2 shows another known circuit for switching between two clocks CLK0 and CLK1 with a fixed phase difference between them. The circuit consists of two negative edge triggered flip-flops (DFF0 and DFF1) with the QN output of DFF0 connected to the D input of DFF1 via an AND gate AND1. By negative edge triggered it is meant that the flip-flops trigger on the falling edge of the clock. The inverter circles at the clock inputs indicate the negative edge triggering.

Similarly, the QN output of DFF1 is connected to the D input of DFF0 via an AND gate AND0. The Q outputs of DFF0 and DFF1 are AND'ed with CLK0 and CLK1 via the AND gates AND2 and AND3 and finally OR'ed to get the output clock which is fed to the rest of the design.

The feedback connection enables glitch free clock switching which is controlled by the CLK_SELECT signal that is appropriately registered and comes from the rest of the design. The CLK_SELECT signal can only be changed at the positive edge of the operating clock and is known sufficiently early during the current operating clock cycle.

To Switch from CLK0 to CLK1:

The circuit starts with the Q outputs of both flops DFF0 and DFF1 at logic 0.

In the normal operating mode, CLK_SELECT=0 and AND0 behaves as a pass gate resulting in the propagation of CLK0 to the rest of the design. Thus the design by default operates on CLK0, which is the phase advanced version of CLK1. The circuit is stable in this mode with Q=1 for DFF0 and Q=0 for DFF1. Is this right?

When CLK_SELECT switches to 1 sometime during the positive phase of CLK0, AND0 propagates 0 which is only registered at the negative edge of CLK0. Subsequently, AND1 starts to behave as a pass-gate propagating logic 1, which is latched at the negative edge of CLK1, again because the clock signal is inverted. This occurs later in time since CLK1 is phase shifted with respect to CLK0. Thus, the output clock switches to CLK1 only when it goes high. The switch from CLK0 to CLK1 allows the concerned pipeline stage to steal time equivalent to the phase difference between the clocks (as shown by the arrow 30 in FIG. 3). Thus, the rest of the pipelined design now operates on CLK1.

If CLK_SELECT remains at logic 1, then the rest of the design continues to operate on CLK1 which means no further time stealing is possible.

To switch from CLK1 to CLK0:

Since the design now operates on CLK1, it implies that the Q output of DFF1 is at logic 1 and QN=0. Similarly, Q of DFF0 is at logic 0 and QN=1. A switch in the CLK_SELECT value to 0 at the positive edge of CLK1 (this is now the operating clock of the design) results in AND1=0, AND0=0. Thus, at the negative edge of CLK0, a logic 0 is propagated through DFF0 (Q=0, QN=1). At the negative edge of CLK1, a logic 0 is propagated though DFF1(Q=0, QN=1) as well. Thus, the output clock stays low at logic 0. In other words, an immediate switch back to CLK0 does not happen resulting in one CLK0 clock edge being missed (or gated). The switch back to CLK0 happens at the start of the next cycle of CLK0 as shown by the arrow 32 in FIG. 3.

This circuit thus provides switching between two related clocks with fixed phase offset.

Figure 3:
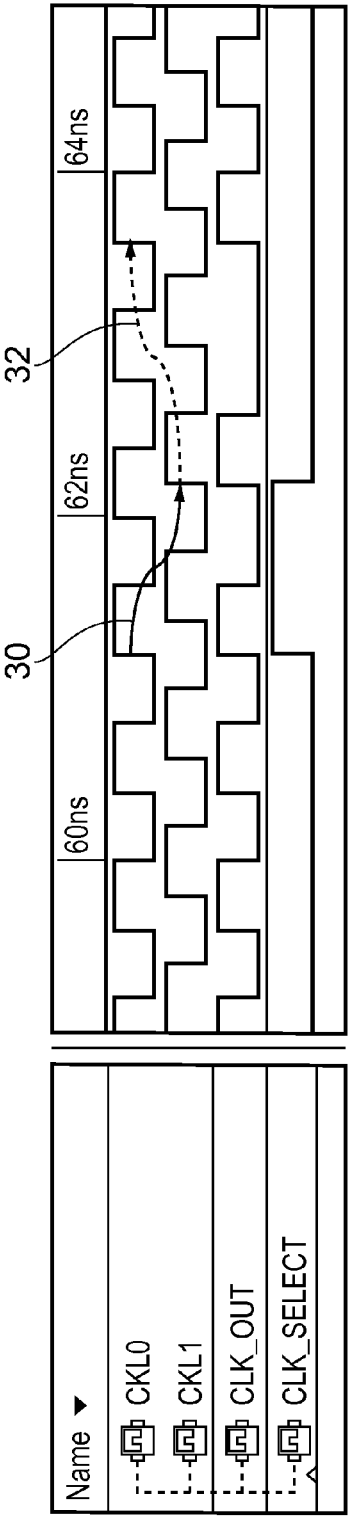
FIG. 3 is a timing diagram to show the operation of the circuit of FIG. 2.

FIG. 3 is a timing diagram for the circuit of FIG. 2 depicting the clock cycle extension in CLK_OUT when switching from CLK0 to CLK1 (30) and the delayed switch back from CLK1 to CLK0 (32). CLK_SELECT is asserted by the design at the positive edge of CLK0 and is deasserted after one extended clock cycle which happens to be the positive edge of the current design clock CLK1. If CLK_SELECT is not deasserted, the design continues to operate on CLK1.

In summary, the circuit of FIG. 2 comprises a first latch DFF0 clocked by a first clock signal CLK0, having a logic gate AND2 at the output for passing the first clock in dependence on the first latch output. A second latch DFF1 is clocked by a second clock signal, having a logic gate AND3 at the output for passing the second clock in dependence on the second latch output. One of the logic gates only is used to pass its associated clock signal. Which logic gate is active depends on the clock select signal.

A first feedback arrangement is provided from the output of the first latch DFF0 to the input of the second latch, and a second feedback arrangement is provided from the output of the second latch DFF1 to the input of the first latch DFF0.

When there is change to the clock select signal, the changes need to propagate through the circuit latches before the stable clock output is obtained. For example, when the clock select signal steps from 1 to 0, the QN output of DFF1 only changes after a falling edge on CLK1, so there is a delay before the output of the gate AND0 reacts. Thus, after a clock select transition from 1 to 0, there needs to be a falling edge on CLK1 followed by a falling edge on CLK0 before the output has switched. For a clock select transition from 0 to 1 there needs to be a falling edge on CLK0 followed by a falling edge on CLK1. This does not cause a delay because of the phase relationship between CLK0 and CLK1. The circuit is thus not symmetrical, and a transition in one direction of the clock select line causes latching delays.

The limitation of the previous scheme is thus the inability to switch from CLK1 to CLK0 in the same cycle, results in an increase in the total execution time.

The invention overcomes this limitation by making it possible to switch back from CLK1 to CLK0, thus reducing the overall execution time and achieving cycle compression. In addition, it provides other possibilities discussed below.

Figure 4:
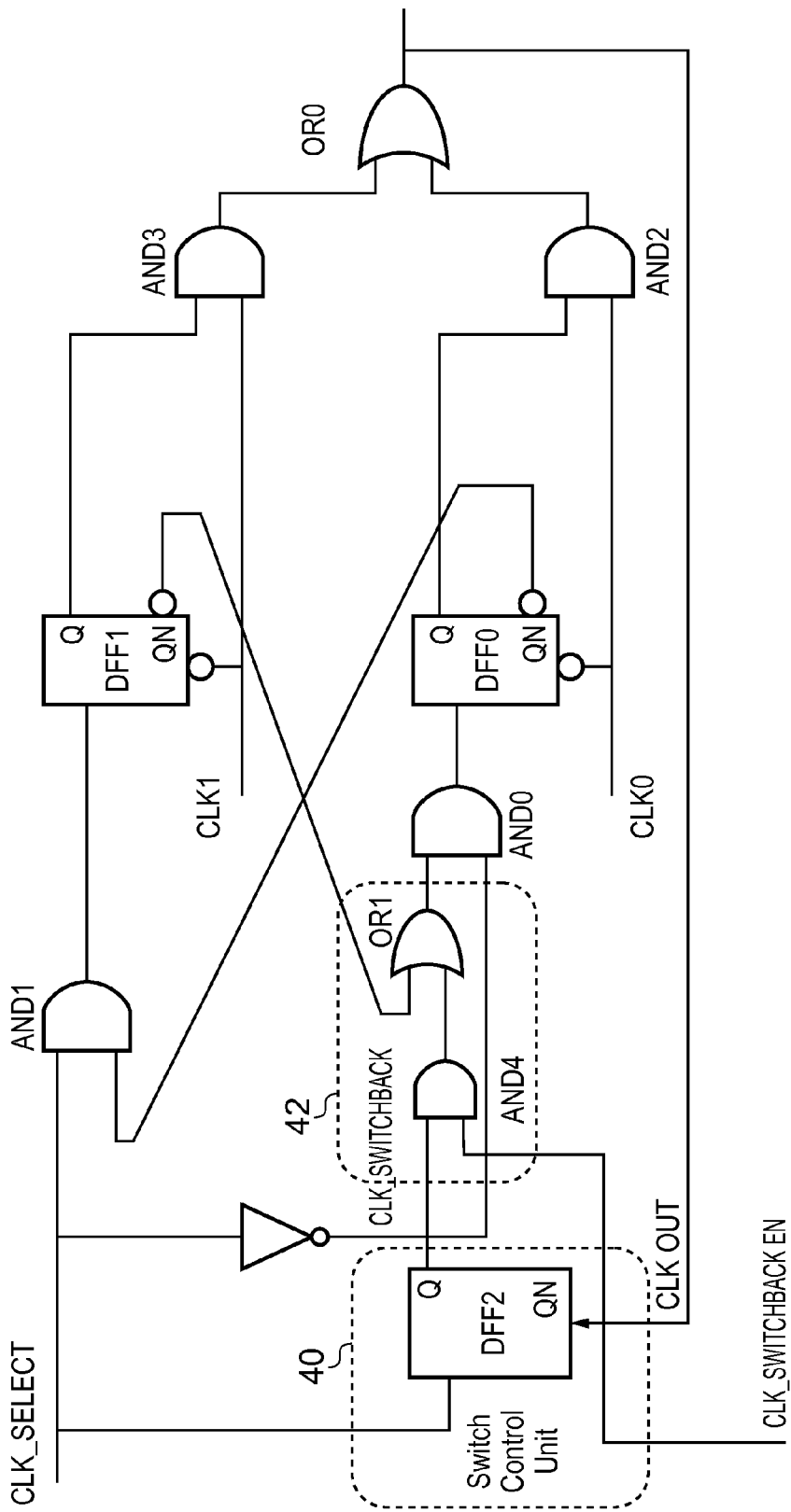
FIG. 4 shows a first clock selection circuit of the invention.

FIG. 4 shows a first example of modified clock switch circuit of the invention that exploits "Period Averaging" by enabling early return from CLK1 to CLK0. This circuit provides time stealing with period averaging (which will be referred to as "TSPA").

Figure 5:
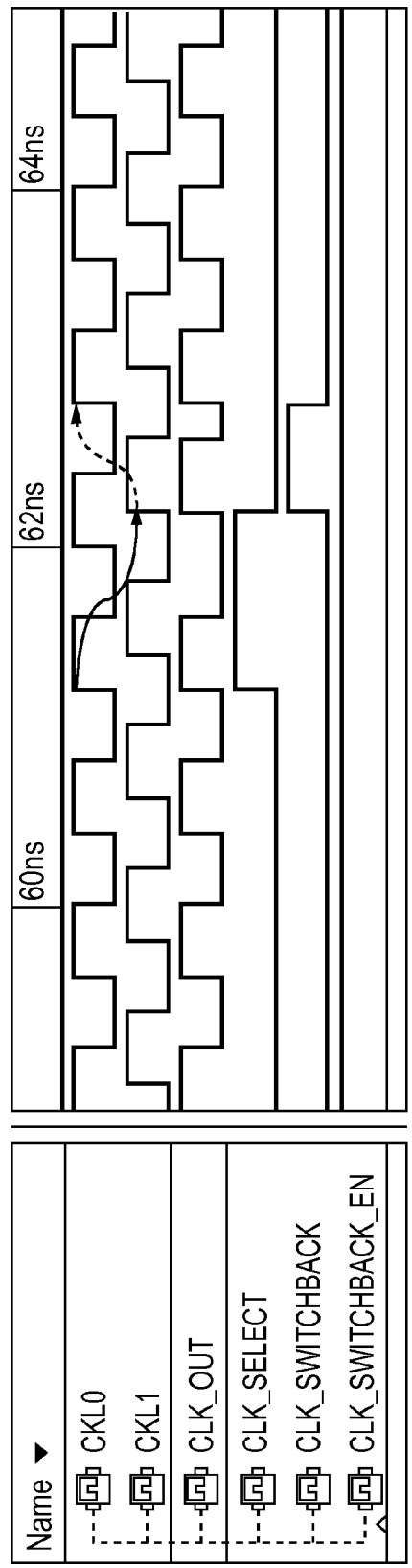
FIG. 5 is a timing diagram to show the operation of the circuit of FIG. 4.

FIG. 5 is a timing diagram of the circuit of FIG. 4 indicating this period averaging by enabling early return from CLK1 to CLK0 and controlled by an additional registered CLK_SWITCHBACK signal. Period averaging is achieved by allocating more time to one cycle and reclaiming time from another, thus maintaining the same overall execution time.

The circuit corresponds to the circuit of FIG. 2, together with a clock switch control unit 40 and an additional logic gate arrangement 42.

These elements function as an override or bypass circuit which is provided in the feedback arrangement which suffers from latching delays. The override circuit prevents a latching delay in the feedback arrangement. In the example of FIG. 2, the feedback path from the second latch DFF1 to the first latch DFF0 gives rise to the delay, and the additional circuit is provided in that path.

The control signals that enable the additional functionality come from the clock switch control unit 40. This comprises a latch DFF2 which receives as input the clock select signal, and receives as clock signal the output clock. Since the clock select signal changes on rising edges of the output clock, the clock input to DFF2 is always high immediately after a change in the clock select signal, so that the change is latched to the output immediately.

Additional intelligence is incorporated into this switch control logic with inputs from the rest of the design and possibly external sensors to determine when clock switching can be done.

The switch from CLK0 to CLK1 (CLK_SELECT changing from 0 to 1) is the same as that described for the circuit of FIG. 2.

When CLK_SELECT changes from 1 to 0, it is latched immediately by DFF2 resulting in CLK_SWITCHBACK=1 at the next positive edge of the output clock, namely within one cycle later (see timing diagram in FIG. 5). This implements the change to be made by the feedback path from DFF1 to DFF0 (i.e. the input to DFF0 changing from 0 to 1).

Thus the presence of two additional gates AND4 and OR1 in the arrangement 42, and the flip-flop DFF2 enables an immediate switchback from CLK1 to CKL0 thereby achieving cycle compression, something that was not possible with the circuit in FIG. 2.

Since the circuit expands certain clock cycles and can compress other cycles, it achieves roughly the same execution time as a normal clock without switching. To be precise, a clock cycle extension when followed by a clock cycle compression completes an operation in the same time as a conventional clocking architecture thereby achieving "period averaging". However, in the presence of timing variations, the probability of successful operation completion is improved by cycle extension. Further, while cycle extension is achieved by simply switching to a phase delayed clock, cycle compression can only be done if sufficient dynamic slack is present in all pipeline stages. Since this is not precisely known, cycle compression via clock switchback is normally done when certain system conditions are satisfied.

Figure 6:
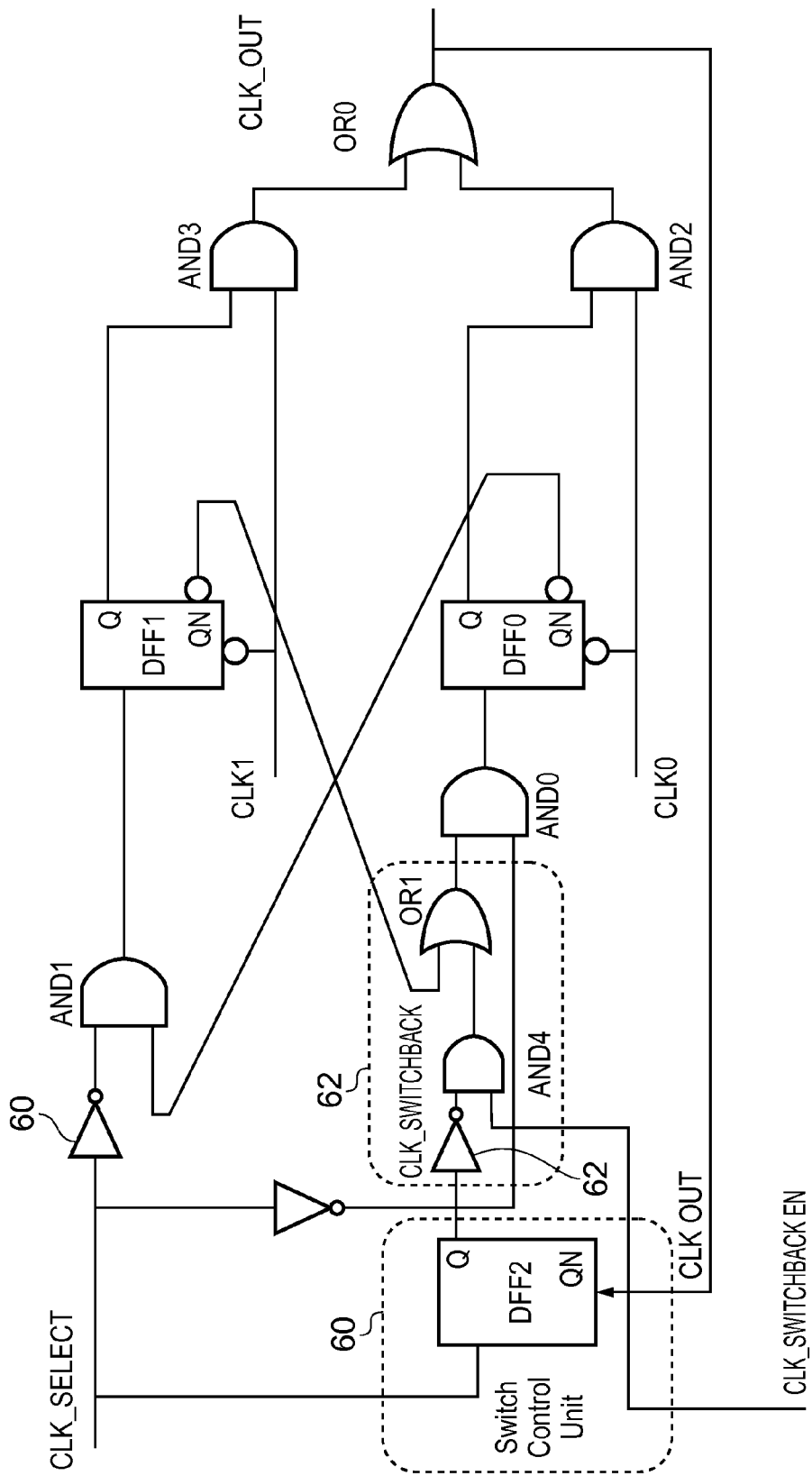
FIG. 6 shows a second clock selection circuit of the invention.

FIG. 6 shows a second example of modified clock switch circuit of the invention which provides Time Lending with Period Averaging (which will be referred to as "TLPA").

The circuit in FIG. 4 made it possible to dynamically switch from a reference clock CLK0 to a phase delayed clock CLK1 and vice-versa. In more generic terms, a clock cycle extension is achieved when switching from a reference clock CLK(Ref) (CLK0 in FIG. 4) to a phase delayed clock CLK(+φ) (CLK1 in FIG. 4), where φ is the phase difference between the clocks. A cycle compression is achieved when immediately switching back from the new reference clock (which is CLK(−φ)) to the original reference clock CLK (Ref). It must be noted that a compression cycle can only be done after an extension cycle to return back to the original operating clock.

The alternative embodiment of FIG. 6 performs a cycle compression followed by cycle extension (instead of the cycle extension followed by cycle compression as in FIG. 4).

This is useful when it is determined that the present cycle does not need a complete cycle (and can therefore be compressed and lend time) but the successive cycle needs to be given more time (cycle extension that can receive additional time uncovered by compression).

The circuit in FIG. 6 has a switch control unit 60 and logic unit 62 (corresponding to units 40,42 in the circuit of FIG. 4). The AND gate AND1 is supplied with complementary version of the CLK_SELECT signal, by virtue of the inverter 60, and the output of the switch control unit is inverted by inverter 62. The AND gate AND0 receives a non-inverted version of the clock select signal.

In this circuit, CLK_SELECT=0 corresponds to CLK1 and CLK_SELECT=0 corresponds to CLK0. Thus, a clock select pulse provides switching from CLK1 to CLK0 and back, and this provides compression then extension.

The additional circuitry again bypasses latching delays associated with the transition from CLK1 to CLK0 (where CLK0 is phase delayed by less than π compared to CLK1).

The circuit achieves cycle compression by switching from CLK1 to CLK0 (i.e. CLK_SELECT switching from 0 to 1) and extension by switching back from CLK0 to CLK1. The working of this circuit is similar to that of FIG. 4.

This circuit exploits "Period Lending" by reducing the time allocated for one cycle and apportioning the saved time for the next cycle to enable longer execution.

Figure 7:
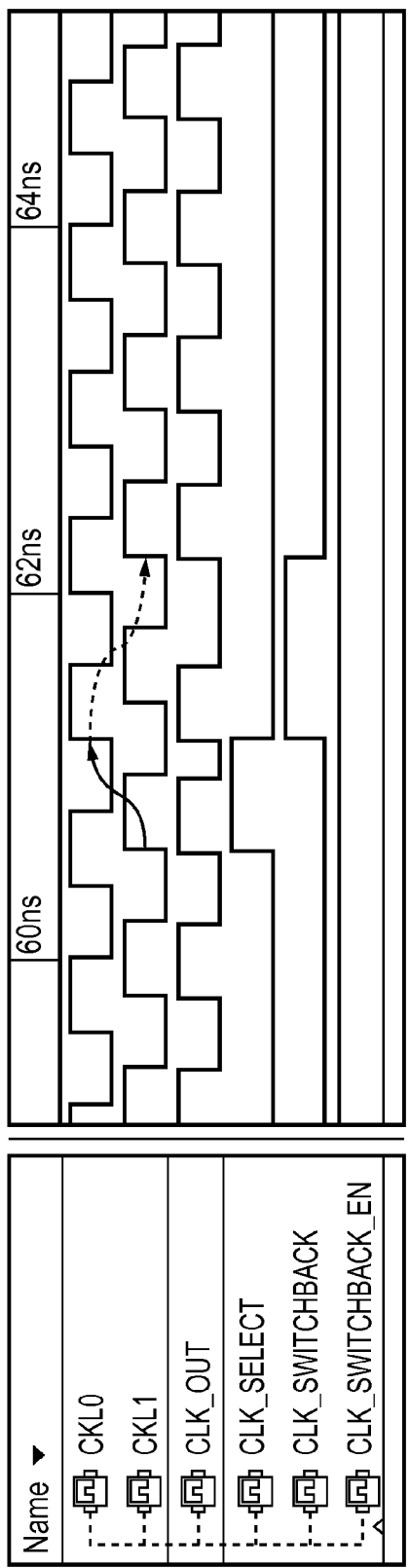
FIG. 7 is a timing diagram to show the operation of the circuit of FIG. 6.

FIG. 7 is a timing diagram of the circuit of FIG. 6 indicating "period averaging" by reducing the period of one cycle by switching from CLK1 to CLK0 and by lending the time saved to the subsequent clock cycle by switching from CLK0 to CLK1. The registered signal CLK_SWITCHBACK controls the switchback. Period averaging is achieved by allocating less time to one cycle and more time to another, thus maintaining the same overall execution time.

The above two clock switching circuits can be combined in a single circuit to exploit both cycle extension/borrowing and cycle compression/stealing.

Two embodiment system architectures, namely "centralized clock switch architecture" and "distributed clock switch architecture", that exploit clock switching and apply it to a generic synchronous pipeline are now discussed.

The two circuits above share the following components:

A "Clock phase generator" module that accepts a master clock and generates one or more clock phases using one or more delay buffers. This unit is not shown in the figures above, and it generates the clock signals CLK0 and CLK1. A flexible clock phase generator is more advantageous since it allows generation of several distinct phase values which enables post-silicon calibration and selection of the most appropriate phase value φ.

A "Clock switch circuit" that enables glitch free switching from a first clock signal to a second clock signal and vice-versa, wherein both clocks are derived from a common oscillator (or master clock), thereby achieving an effective duty cycle modulation which results in either cycle stealing or cycle lending or general clock phase hopping. The clock switch circuits described above can be extended to switch between more than 2 clock phases as needed.

A "Clock switch controller" that receives information from various sources such as the design, the system or external sensors and makes a decision to either carry out cycle stealing, lending, clock phase hopping, stalling or stall compression to minimize performance impact or enable successful completion of operations in the presence of timing variations in conventional designs and/or designs with reduced timing guard-bands.

The architecture of a clock switch and controller can combine one or more of the above components in a "centralized" or "distributed" manner so as to achieve inter-pipeline synchronization and "elastic pipeline execution" thereby making the design more resilient to timing variations.

A synchronous pipelined architecture with edge triggered flip-flops imposes strict timing constraints on when data in different pipeline stages can be latched or when a new computation can be launched.

FIG. 8 summarizes various pipeline execution patterns that are possible in a conventional pipeline and in an architecture that is capable of exploiting cycle stealing and lending via clock switching. With this figure it is easy to illustrate the advantages of clock lending and stealing and the rich set of architectural possibilities that exist.

Without loss of generality, it is assumed that in addition to the reference clock Clk1(Ref), two other clock phases that differ by +φ and −φ i.e. clk2(+φ) and clk0(−φ) are available as shown in FIG. 8. All clocks are derived from the same master clock and have a period P.

Cycle stretching by a time +φ is achieved when a switch is made from clk1(Ref) to clk2(+φ) or clk0(−φ) to clk1(Ref). Cycle compression by a time −φ is achieved when a switch is made from clk2(+φ) to clk1(Ref) or from clk1(Ref) to clk0(−φ). This type of switching is possible using the clock switching circuit described previously. The clock switch circuit can be extended or modified to switch between more clock phases as well. In general, with multiple clock phases, it is also possible to continuously hop from one clock phase to the next in a round robin manner without using cycle compression. This continuous cycle extension by switching from one clock to the next (without any compression) is referred to as phase hopping in this document.

In FIG. 8, the effective clock CLK(Eff) follows the switching as indicated by the arrows 80 resulting in cycle stretching followed by cycle compression (i.e. TSPA) and then cycle compression followed by extension (i.e. TLPA). Period averaging is achieved by opportunistically returning back to the reference clock when possible (e.g. on stalls to achieve stall compression). The arrows 82 show yet another possible execution pattern.

FIG. 9 shows a centralized clock switch architecture that enables global clock switch across all pipeline stages. The architecture has a centralized clock switch decision control device 90 that receives inputs from various pipeline stages (Dctrl) and from the system or external sensors (Sctrl) and decides if a clock switch can and must be done to exploit TSPA or TLPA. The three clock signals shown in FIG. 9 are generated from a master clock 92 by a clock phase generator 94, and a clock switch circuit 96 controls the clock switching.

The system consists of multiple pipeline stages (S1, S2, S3) and edge triggered pipeline registers (R1, R2, R3, R4) that receive their clock from the clock phase generator and switch circuits which drive the entire pipeline. The system typically operates on clock CLK1(Ref) and has the capability to switch to CLK0(−φ) or CLK1(+φ) which differ from CLK1 only in phase by a value −φ and +φ respectively. The decision to switch is obtained from the system Sctrl (e.g. external sensors) or from the design (Dctrl).

Any decision to switch the clock is applied to all the pipeline stages S1 to S4. In other words, if one pipeline stage requires more time to complete its operation, then all pipeline stages are given an additional time of φ.

If a clock switch is not possible, then the pipeline is stalled. A centralized global clock switch scheme is relatively simple and has low implementation overhead.

In contrast, FIG. 10 shows a distributed clock switch architecture that has per-stage clocks and clock switch control unit.

In FIG. 10, the system again consists of multiple pipeline stages (S1, S2, S3) and edge triggered pipeline registers (R1, R2, R3, R4) that receive their clocks from multiple local clock phase generators and switch circuits. The system typically operates on clock CLK1(Ref) and has the capability to switch to CLK0(−φ) or CLK1(+φ) which differ from CLK1 only in phase by a value −φ and +φ respectively. The clock switch controller receives control information from the design (Dctrl), from the system or external sensors (Sctrl) and other pipeline clock switch controllers (Fctrl) to make a decision about when and where to switch the clock to make the pipeline more elastic.

The decision to switch the clock is made locally at each pipeline stage subject to certain constraints. However, for correct pipelined execution, the clock switch information must be shared across other pipeline stages and an appropriate decision taken to synchronize actions resulting in a more complex architecture.

FIG. 10 basically shows the architecture of FIG. 9 applied to stages S2 and S3, with the clock switch signal applied to the preceding pipeline registers. The same architecture is applied to all stages, but this is not shown in order to keep the diagram simple.

FIG. 11 shows an example of possible pipeline execution patterns and performance impact due to clock stealing and lending with two clocks. The figure shows three pipeline stages S1, S2 and S3 and the flow of operations (op2 through op6) through the stages and the time in cycles.

Row (A) corresponds to a conventional pipelined execution in which each operation completes in a single cycle, and in which all operations complete within a cycle period P and meet the setup and hold time requirements of the pipeline registers.

Row (B) shows execution with clock switching and cycle stretching followed by cycle compression and switchback in a distributed clock switch architecture.

During the execution of operation op4 in stage S1, it is determined that extra time is needed to complete the execution since it sensitizes a rarely executed critical path. The clock switch controller in stage Si decides to extend the cycle by switching from clk1 (Ref) to clk2(+φ). For correct pipelined execution, a similar cycle extension must be made for the subsequent pipeline stage and all previous pipeline stages. The clock of stage S3 however does not need to be switched the current cycle; it only needs to switch the next cycle since the root cause for cycle extension is the operation in stage S1.

If it is known that the time required to complete the next operation op5 in S1 and the operation op4 in stage S2 is less than P−φ, then an immediate switch-back to clk1 (Ref) can be done resulting in a cycle compression and no performance loss. A distributed clock switch architecture that receives information from other pipeline stages and can control clock switch in individual pipeline stages subject to certain rules makes it possible to achieve this type of execution.

In general, a cycle stealing operation in stage "x" $S_X$ of the pipeline by switching from clk1 (Ref) to clk2(+φ) requires that a similar switch be made in stage $S_{x+1}$ and all previous stages $S_{x-1}$, $S_{x-2}$, ... in order to latch the correct data. Stage $S_{x+2}$ can continue on clk1 (Ref) for one cycle, but the switch made in stage $S_{x+1}$ must be rippled to later stages if a switch back to clk1 (Ref) is not done. Similarly, a cycle lending operation by switching from clk1 (Ref) to clk0(−φ) and then to clk(Ref) in stage $S_X$ requires that the later stages of the pipeline $S_{x+1}$, $S_{x+2}$, also follow the same clock switch pattern for correct operation. In the presence of feedback between pipeline stages, a cycle stealing/lending operation in any stage $S_X$ must be applied to all other stages $S_{x-1}$, $S_{x-2}$, $S_{x+1}$, $S_{x+2}$ as well resulting in a centralized clock switch architecture.

Row (C) shows execution with clock switching and cycle stretching followed by no cycle compression in a distributed clock switch architecture.

In this case, the execution of the operations in cycle 2 is continued with the switched clock clk2(+φ) without cycle compression thus providing subsequent operation the complete clock cycle time P The clock switch information generated in cycle 1 is now propagated to the stage S3 in cycle 2 allowing S3 to also switch to clk2(+φ).

Row (D) shows execution with clock stretching/compression applied to all pipeline stages in a centralized clock switch architecture.

Once a switch is made from clk1(Ref) to clk2(+φ), no further cycle time extension is possible. Thus, if the need to increase the cycle time to complete certain operation arises, then the entire pipeline is stalled for a cycle to allow the operation to complete. Alternatively, if round robin clock phase hopping is implemented, then stalling can be avoided by switching to the next available clock phase (FIG. 16 shows an example of phase hopping). Stalling the pipeline is a technique that is almost always present in all microprocessor pipeline architectures. Stalling is also used as a last resort, for example when several successive operations require additional time for execution and the system is not possible to switch the clock anymore. In normal ASIC designs, a mechanism of stalling the pipeline via clock gating can make the pipeline more resilient to timing errors at the cost of occasional stall cycles.

Row (E) shows a conventional pipelined execution in which the pipeline is stalled if an operation cannot complete within a cycle. Thus, if timing delays increase, for example due to temperature or change in other operating conditions, or if a computation sensitizes a critical path that is expected to exceed the time P, then the entire pipeline is stalled to allow the operation to complete. This can be achieved by gating the clock signal for a cycle. Correct data is latched and propagated once the stall cycle is complete.

If P is the clock period, then the time required to complete operation op4 in the above execution patterns is 3P, 3P, 3P+φ, 3P−φ and 4P seconds respectively.

An alternative arrangement of the present invention is such that instead of spending a full cycle stalling as described above, the pipeline is stalled for a time P−φ.

This is achieved by simply compressing the stall cycle by switching back from the current phase shifted clock clk2(+φ) to clk1(Ref). Clock switch with stall compression is a simple optimization that can reduce the performance loss that is incurred due to stalling since in the common case, a complete stall cycle is overly pessimistic. The clock switchback enables future operations to exploit cycle stealing. The performance potential of this optimization when compared to traditional stalling and running with a slower clock is summarized in FIG. 12.

This opportunistic clock switchback is not limited just to stall compression. It can be invoked during other situations such as when the whole processor is in idle mode. Another alternative involves building additional intelligence into the clock switch controller to take into account prevailing environmental conditions by running sample test sequences in a test mode to determine availability of slack in various pipeline stages and use this information to aid decision making.

FIG. 12 shows three pipeline stages S1, S2 and S3 and the flow of operations (op2 through op7) through the stages and the time in cycles.

Row (A) again shows the conventional pipeline in which the pipeline is stalled for one cycle to allow a critical operation to complete before resuming. Two stalls in cycle 2 and 5 are shown.

Row (B) shows the conventional pipeline operating with a lower clock frequency (period=P+φ) that provides ample time to complete all operations each cycle and therefore does not require any stalls.

Row (C) shows the centralized clock switch architecture in which a clock switch extends the cycle time in cycle 1 and cannot steal any more time since there are only 2 clock phases. The operation in cycle 3 requires additional time, but time stealing is not possible. A stall is required to complete the operation.

Row (D) shows the centralized clock switch architecture with stall compression and opportunistic clock switchback. When the pipeline is stalled, a switch-back to the original clock is done resulting in a compressed stall cycle. This allows future clock stretching operations to be performed.

If P is the clock period, then the time required to complete operation op5 starting with the current execution state in the above execution patterns is 6P, 4*(P+φ), 5P+φ and 5P seconds respectively.

Yet another embodiment of the present invention has the ability to adapt the execution according to the current operating program phase and to perform an online test of the integrated circuit to determine the usefulness of clock switching. This can be done by changing the master clock frequency, for example once every few seconds, and performing a sweep across the feasible operating range. At each frequency step of the master clock a test program can be executed with clock switching enabled and the performance benefit of switching can be assessed at that operating frequency.

This is possible since the glitch free clock switch circuit is generic and can be used to switch between clocks that are multiples of each other but with a fixed phase difference. Thus, by changing the frequency of the master clock several possible calibration and test frequencies and phases can be evaluated. This in turn can be used as a heuristic mechanism to set the clock phase difference i.e. value of φ based on the current operating conditions. If the conditions improve or worsen a recalibration test run can be executed to re-evaluate the effectiveness of clock switching and determine a new phase value φ that can minimize performance loss.

The clock phase generator circuit must be configurable to generate the determined phase. This feedback can also be used to completely switch off the clock switch mechanism when the operating conditions are favorable and the integrated circuit is a fast chip for power reasons. In such a scenario, clock switching can be enabled as chip aging sets in. The clock phases to be used can be determined by running the above test and calibration sequence.

FIGS. 13 and 14 show one possible clock switch pattern that enables cycle stealing and lending to make pipeline stages more elastic and achieve overall period averaging in a centralized architecture. FIGS. 13 and 14 show the behavior of stealing/lending in the form of equations.

FIG. 13 shows cycle stealing with a centralized clock switch. The normal clock period is P. The execution period is extended or reduced by $\phi$. Operand op3 requires more time for execution in Stage S2 and is give extra time by switching to a phase delayed clock. All stages of the pipeline are also now clocked with this delayed clock thereby achieving interlocked execution. A switchback to the original clock is possible resulting in a compression across all pipeline stages as is shown in Col6. The values in brackets represent yet another possible execution pattern.

FIG. 14 shows cycle lending with a centralized clock switch. The normal clock period is P. The table shows the effect of applying stealing/lending in the critical stage S2 of the pipeline.

The end result of exploiting these stealing and lending operations in an intelligent clock switch controller is that the number of errors that would result due to delay variations reduces.

The invention can also be applied to system architecture with multiple clocks with general phase hopping (which can be considered to be cycle stretching implemented in a round robin manner with no cycle compression). FIG. 15 shows a system architecture that is capable of switching/hopping between 4 clock phases, for example to extend the cycle time whenever a critical instruction is executed, by switching from one clock phase to the next in a round robin manner. The system comprises of 2 clock switching units SW12 and SW34 that are connected in a feedback fashion, an output multiplexer MUX1 and additional input logic (XOR0 gate and additional AND gates).

SW12 has clocks CLK0 and CLK1 that are fed to its input ports CLK0_I and CLK1_I. SW34 has the clocks CLK2 and CLK3 connected to its input ports CLK2_I and CLK3_I. The operation of SW12 and SW34 are the same as described previously. The output clocks from each switching unit SW12_CLK_O and SW34_CLK_O are fed to an output multiplexer MUX1 that selects one of the two based on a select signal. Each switch SW12 and SW34 consists of a Finite State Machine (FSM) denoted by CLK1_FSM, CLK2_FSM for the two clocks. These FSMs enable sophisticated control of the behavior of the output clock CLK_O. SW12 and SW34 have further inputs and outputs that are again connected in feedback. The outputs of SW12 are connected to the inputs of SW34 (CLK0_state_O to CLK0_state_I, CLK1_state_O to CLK1_state_I, Enable_SW34_O to Enable_SW34_I). Similarly, the outputs of SW34 are connected to the appropriate inputs of SW12 (CLK2_state_O to CLK2_state_I, CLK3_state_O to CLK3_state_I, Enable_SW12_O to Enable_SW12_I). All feedback connections are not shown to prevent cluttering and maintain clarity of the figure.

The control signal Allow_CLK34 is a function of the state of the FSM and is depicted as "F( )? 1:0" to maintain clarity in the figure. This signal controls the output mux MUX1 as well as the select signals of the individual switching units. The value taken by Allow_CLK34 is determined by the FSM in SW34. When Allow_CLK34=1, CLK_O is assigned the output clock from SW34 (SW34_CLK_O). If Allow_CLK34=0, which is the default condition, CLK_O=SW12_CLK_O.

Also, as indicated in the figure, the select inputs of SW12 and SW34 is governed by the following equations:

SEL_SW12_I=Switch_Ctrl & not(Allow_CLK34)

SEL_SW34_I=Switch_Ctrl & Allow_CLK34

Switch_Ctrl is an input signal that determines if the system should switch from the current operating clock to the next clock phase. Switch_Ctrl is the actual timeborrow signal coming from the design that controls if additional time is needed to complete a concerned pipeline operation.

One possible implementation of the FSM that enables clock phase hopping and elastic execution using the circuit in FIG. 15 is shown in FIG. 16. The system switches from one clock phase to the next in a round-robin fashion (as indicated by the arrows) in response to the Switch_Ctrl time borrow input signal. Note that when Switch_ctrl=1 always, the above FSM enables continuous phase hopping which effectively means that the circuit runs at a larger period P+$\phi$. This information can then be used to put the system in a different operating condition. This system only extends a cycle whenever required by continuously stealing time by hopping to the next available clock phase. No cycle compression is done in this example. However, the FSM can be modified to achieve cycle compression functionality as well.

FIG. 17 shows the FSM required to achieve the phase hopping behavior of FIG. 16. Each clock has its own FSM comprising of 4 states (S0, S1, S2 and S3) that is triggered on the positive edge of the concerned clock and the state of the other FSMs (indicated by dashed lines). The X-axis shows the transition of between states in different FSMs as time progresses.

The primary advantages of the present invention are:

1. Ability to switch back and forth between clock phases to achieve (i) cycle extension followed by compression or cycle stealing and/or (ii) cycle compression followed by extension or cycle lending. While the former can be achieved with the circuit shown in FIG. 1 as well, the latter is not possible. Further, the circuit described can be used to switch between clocks that are multiples of each other but with a fixed phase relationship in a glitch free manner. This makes it possible to switch to a faster clock for short bursts if the operating conditions are favourable and it is deemed that the operations can be completed faster.

2. Ability to opportunistically switch back from a phase shifted clock back to the original reference clock based on stalls or related pipeline conditions so as to minimize performance degradation.

3. System architectures (as shown in FIGS. 15, 16) that exploit the above techniques that enable several embodiments of pipelined execution patterns at the system level paving the way for "elastic pipelined execution" that is more resilient to timing variations. Since the technique works at the granularity of complete pipeline registers, it is potentially more area efficient than techniques that work on individual flip-flops to borrow time.

The present invention concerns clocking and can be applied to any synchronous digital pipelined design ranging from ASICs pipelines to microprocessor pipelines. The flexibility of the present invention enables several pipelined execution patterns making the design more tolerant to timing variations and presents possibilities for innovation at circuit and system level.

The design complexity and area overhead of the centralized clock switch architecture is minimal and is an attractive candidate for SIMD processors, VLIW, vector processors and DSP pipelines.

The circuit of FIG. 2 can switch from a slower clock (CLK0) to a faster clock (CLK1) provided that the frequencies are multiples of each other. The design of the invention can also be used in this way. An example is to wakeup a design from a low power mode operating at a lower frequency to a faster mode with a higher frequency clock by switching the clock.

Various modifications will be apparent to those skilled in the art.

The invention claimed is:

1. A clock select circuit for providing a selected clock signal to its output, comprising:
    a first branch, which includes a first latch clocked by a first clock signal, the first branch having a logic gate at the output for passing the first clock signal to the circuit output in dependence on the first latch output;
    a second branch, which includes a second latch clocked by a second clock signal, the second branch having a logic gate at the output for passing the second clock signal to the circuit output in dependence on the second latch output;
    a first feedback arrangement from the output of the first latch to the second branch before the second latch;
    a second feedback arrangement from the output of the second latch to the first branch before the first latch; and
    an override circuit provided in the first or second feedback arrangements for preventing a latching delay in that feedback arrangement.

2. A clock select circuit as claimed in claim 1, wherein one of the clocks is a phase delayed version of the other with the same clock period.

3. A clock select circuit as claimed in claim 1, wherein the first and second latches are edge triggered.

4. A clock select circuit as claimed in claim 1, wherein a clock select signal is provided to one branch and an inverted clock select signal is provided to the other branch.

5. A circuit as claimed in claim 1, wherein each branch comprises an AND gate which receives the clock select signal or inverted clock select signal and a feedback signal, wherein the output of the AND gate is provided to the input of the latch.

6. A circuit as claimed in claim 1, wherein each branch comprises an AND gate at the end of the branch, which receives the latch output and the clock signal associated with the latch.

7. A circuit as claimed in claim 1, wherein the override circuit comprises a latch having a clock select signal at its input, and a logic gate arrangement or overriding the feedback signal in the associated feedback arrangement.

8. A circuit as claimed in claim 7, wherein the logic gate arrangement comprises an OR gate for combining the feedback signal of the associated feedback arrangement with the clock select signal latched by the latch of the override circuit.

9. A circuit as claimed in claim 1, which is adapted, in response to two sequential changes in clock select signal, to extend the duration of one clock phase by switching from the first clock to the second, phase delayed clock and to switch back from the second clock to the first clock to shorten the duration of a subsequent clock phase.

10. A circuit as claimed in claim 1, which is adapted, in response to two sequential changes in clock select signal, to shorten the duration of one clock phase by switching from the second, phase delayed clock to the first clock and to switch back from the first clock to the second clock to extend the duration of a subsequent clock phase.

11. A method for selecting a clock signal from at least a first clock signal and a second clock signal, comprising:
    clocking a first latch in a first branch with a first clock signal and passing the first clock signal to the circuit output in dependence on the first latch output;
    clocking a second latch in a second branch with a second clock signal and passing the second clock signal to the circuit output in dependence on the second latch output;
    in a first feedback arrangement, feeding back the output of the first latch to the second branch before the second latch;
    in a second feedback arrangement, feeding back the output of the second latch to the first branch before the first latch; and
    preventing a latching delay in one of the feedback arrangements using an override circuit provided that feedback arrangement.

12. A method as claimed in claim 11, wherein one of the clocks is a phase delayed version of the other with the same clock period.

13. A method as claimed claim 11, comprising providing a clock select signal to one branch and an inverted clock select signal to the other branch.

14. A method as claimed in claim 11, comprising, in response to two sequential changes in clock select signal, extending the duration of one clock phase by switching from the first clock to the second, phase delayed clock and switching back from the second clock to the first clock to shorten the duration of a subsequent clock phase.

15. A method as claimed in claim 11, comprising, in response to two sequential changes in clock select signal, to shorten the duration of one clock phase by switching from the second, phase delayed clock to the first clock and switching back from the first clock to the second clock to extend the duration of a subsequent clock phase.

* * * * *